United States Patent [19]

Klein et al.

[11] Patent Number: 5,565,542
[45] Date of Patent: Oct. 15, 1996

[54] PROCESS FOR THE PRODUCTION OF POLYADDITION OR POLYCONDENSATION PRODUCTS

[75] Inventors: Johann Klein, Düsseldorf; Peter Daute, Essen; Roland Grützmacher, Wülfrath, all of Germany

[73] Assignee: Henkel Kommanditgesellschaft auf Aktien, Duesseldorf, Germany

[21] Appl. No.: 553,316

[22] PCT Filed: May 9, 1994

[86] PCT No.: PCT/EP94/01482

§ 371 Date: Nov. 17, 1995

§ 102(e) Date: Nov. 17, 1995

[87] PCT Pub. No.: WO94/26801

PCT Pub. Date: Nov. 24, 1994

[30] Foreign Application Priority Data

May 17, 1993 [DE] Germany .................... 43 16 483.8

[51] Int. Cl.$^6$ ................................................ C08G 18/48
[52] U.S. Cl. ................. 528/77; 528/74.5; 528/81; 528/85; 528/295.5; 528/301
[58] Field of Search .................... 528/74.5, 77, 81, 528/85, 295.5, 301; 568/853

[56] References Cited

U.S. PATENT DOCUMENTS 2,990,376  6/1961  Bressier et al. ................. 252/182

4,517,334  5/1985  Wilk et al. ....................... 524/539

FOREIGN PATENT DOCUMENTS

| 0113798 | 7/1984 | European Pat. Off. . |
| 2088250 | 1/1972 | France . |
| 3246616 | 6/1984 | Germany . |
| 3504228 | 8/1985 | Germany . |
| 0793780 | 4/1958 | United Kingdom . |

OTHER PUBLICATIONS

Kirk–Othmer, Encyclopedia of Chemical Technology, vol. 2, p. 60 (1992).

W. Keim, A. Behr, G. Schmidt, "Grundlagen der Industriellen Chemie", Verlag Salle + Sauerlaender, Frankfurt. a.m., 1986, pp. 381–396.

*Primary Examiner*—Rachel Johnson
*Attorney, Agent, or Firm*—Ernest G. Szoke; Wayne C. Jaeschke; John Daniel Wood

[57] ABSTRACT

A process is provided for the production of polyaddition and polycondensation products, in which addition products of, on average, 0.5 to 2 moles of ethylene and/or propylene oxide with glycerol are polymerized with polyfunctional isocyanates or polybasic carboxylic acids or carboxylic acid esters a) directly or b) via the intermediate stage of transesterification products with esters of $C_{1-4}$ alcohols and $C_{2-22}$ fatty acids not including the esters of ricinoleic acid. The addition products of glycerol and ethylene or propylene oxide have been found to be a suitable replacement for trimethylolpropane in such reactions.

14 Claims, No Drawings

PROCESS FOR THE PRODUCTION OF POLYADDITION OR POLYCONDENSATION PRODUCTS

The present application was filed under the provision of 35 U.S.C. 371(C) as the U.S. National Phase of PCT applicaton PCT/EP94/01482 filed May 9, 1994.

1. Field of the Invention

This invention relates to a process for the production of polyaddition or polycondensation products in which selected glycerol alkoxylates are polymerized with polyfunctional isocyanates or polybasic carboxylic acids or carboxylic acid esters, optionally via the intermediate stage of transesterification polyols, and to the use of the alkoxylates mentioned for the production of polymers.

2. Prior Art

In an era which is characterized by a growing demand for consumer goods and high-quality products, considerable importance is attributed to the development of new plastics with higher performance levels. However, the improvement of existing types is equally important, particularly in regard to such aspects as the saving of energy during production, the replacement of problematical working materials and a renewable raw material base.

An important building block in the production of plastics is trimethylol propane (TMP) which can be reacted, for example, with polycarboxylic acids to form polyesters or alkyd resins. These compounds may optionally be further crosslinked with isocyanates (in the case of polyester polyols), with air under the effect of light (in the case of unsaturated alkyd resins), by radical initiators or by application of heat. Although TMP has long been known and used in large quantities in polymer technology, its use is still attended by a number of disadvantages:

Trimethylol propane is a solid under normal conditions. It is normally transported in heated tankers and through heated pipelines. Accordingly, the use of this material involves considerable problems and the consumption of energy.

Trimethylol propane is obtained by Tollens condensation of formaldehyde and butyraldehyde, two exclusively petrochemical and, hence, non-renewable raw materials.

Trimethylol propane is highly hygroscopic and, accordingly, has to be dried for numerous applications.

There has been no shortage of attempts in the past replace TMP by other related polyol components. Thus, attempts have been made to replace TMP by glycerol which is liquid and native and should be an ideal substitute. However, it was found that the polymers produced from glycerol show relatively poor resistance to heat, light, moisture and alkalis. In addition, glycerol is highly hygroscopic. Moreover, where glycerol is used as polyol component, acrolein is in danger of being formed as an unwanted secondary product in the presence of acidic catalysts while polyglycerols are in danger of being formed as unwanted secondary products in the presence of basic catalysts [cf. Kirk-Othmer, Encyclopedia of Chemical Technology, 2, 60 (1992)].

Although liquid polyol components, such as glycerol and TMP propoxylates, for example glycerol.3PO (Voranol® CP, Dow) or TMP.5PO (Desmophen® 550, Bayer) are commercially available, they are unsuitable as replacements for TMP because they have a far lower hydroxyl value than TMP. Accordingly, the polymers produced from such liquid polyol components differ in their properties from TMP-based products. Another disadvantage is that the glycerol or TMP propoxylates mentioned react off far more slowly that TMP itself. The use of relatively high molecular weight alkylene oxide adducts with polyhydric alcohols for the production of polymers is described, for example, in DE-A1 32 46 616 (Henkel).

Accordingly, the complex problem addressed by the present invention was to provide new polyol components as replacements for TMP in polyaddition and polycondensation products which would be liquid and less hygroscopic than TMP, would have a favorable ecobalance, would react off quickly and would be sufficiently compatible with a number of reactants. In addition, the resulting polymers would be at least comparable in their properties with those based on TMP.

SUMMARY OF THE INVENTION

The present invention relates to a process for the production of polyaddition and polycondensation products, in which addition products of, on average, 0.5 to 2 moles of ethylene and/or propylene oxide with glycerol are polymerized with polyfunctional isocyanates or polybasic carboxylic acids or carboxylic acid esters a) directly or b) via the intermediate stage of transesterification products with fatty acid lower alkyl esters and/or fatty acid glycerol esters.

DETAILED DESCRIPTION OF THE INVENTION

According to the invention, the glycerol alkoxylates mentioned have proved to be an ideal substitute for TMP in the production of polymers because they are liquid and less hygroscopic than TMP, are largely based on natural raw materials and the resulting plastics are substantially identical in their properties with those based on TMP.

The alkylene oxide addition products according to the invention can react off directly with polyfunctional isocyanates and/or polybasic carboxylic acids or esters to form polyurethanes or polyesters. Compatibility is considerably better than where glycerol is used.

In one preferred embodiment of the invention, however, the reaction proceeds via an intermediate stage in which the alkylene oxide adducts are transesterified with fatty acid esters, preferably synthetic or natural fats and oils. The resulting transesterification polyols can then react off in the second step with polyfunctional isocyanates and/or polybasic carboxylic acids or esters to form polyurethanes or polyesters.

It has surprisingly been found that the addition products according to the invention of 0.5 to 2 moles of ethylene and/or propylene oxide with glycerol—both as direct polyol components and in the form of the transesterification polyols—are a complete replacement for trimethylol propane. Adducts of 0.8 to 1.2 moles of EO and/or PO with 1 mole of glycerol have proved to be particularly advantageous.

The invention includes the observation that, for example, the transesterification polyols based on glycerol alkoxylates and trimethylol propane formed as intermediate stages show comparable low-temperature behavior and comparable viscosity and the compatibility of the transesterification polyols based on the glycerol alkoxylates according to the invention in their reaction with isocyanates is better than in the case of corresponding products based on TMP. The process according to the invention is even capable of producing transparent rigid PU compositions. Corresponding compounds based on glycerol are heterogeneous and incompatible with isocyanates. Polyester polyols based on glycerols with relatively high degrees of alkoxylation give overly brittle compositions.

The reaction of transesterification polyols based on glycerol alkoxylates with polycarboxylic acids, such as adipic acid or phthalic acid, also leads to the corresponding alkyd resins without any problems.

Glycerol alkoxylates

Adducts of alkylene oxides with glycerol are known substances which may be obtained by the relevant methods of preparative organic chemistry. On an industrial scale, they are produced by ethoxylation or propoxylation of glycerol in the presence of basic catalysts, such as for example lithium hydroxide, potassium hydroxide, sodium methylate, strontium phenolate or calcined hydrotalcite, at temperatures of 120° to 180° C. and under pressures of 1 to 5 bar. If mixed alkoxylates are used, the alkoxylation may take place blockwise or at random. After the alkoxylation, the products may be neutralized by addition of acids (phosphoric acid, acetic acid, preferably lactic acid). However, non-neutralized catalysts, more particularly lithium hydroxide, may also be used for subsequent reaction steps, such as for example transesterification/esterification.

In the context of the process according to the invention, it has proved to be of particular advantage to use adducts of on average 0.8 to 1.2 moles of ethylene oxide or propylene oxide with glycerol. The glycerol·1PO and glycerol·1EO adducts are particularly preferred.

Transesterification polyols

As already mentioned, the glycerol alkoxylates according to the invention may either be directly polymerized with the polyfunctional isocyanates or polybasic carboxylic acids (esters) or may be used after transesterification with fatty acid esters.

The transesterification of the glycerol alkoxylates with fatty acid lower alkyl esters and/or fatty acid glycerol esters may be carried out in known manner. The transesterification is normally carried out in the presence of alkaline catalysts, preferably sodium or lithium hydroxide, at temperatures in the range from 180 to 200° C. The ratio of glycerol alkoxylate to the transesterification component should preferably be selected to give the mixture a hydroxyl value of 250 to 450 and preferably 375 to 425.

Suitable transesterification components are esters of $C_{1-4}$ alcohols with $C_{12-22}$ fatty acids such as, for example, cocofatty acid methyl ester and tallow fatty acid methyl ester or saturated, but preferably completely or predominantly unsaturated triglycerides such as, for example, coconut oil, palm oil, palm kernel oil, rapeseed oil, sunflower oil, olive oil, soybean oil or beef tallow.

Isocyanates

Polyaddition and polycondensation processes are known per se and are extensively described in the literature, cf. the Review in W. Keim, A. Behr, G. Schmidt, "Grundlagen der industriellen Chemie", Verlag Salle+Sauerländer, Frankfurt.a.M., 1986, pages 381–396.

The polyfunctional isocyanates which may be used in accordance with the invention for the production of polyurethanes based on glycerol alkoxylates or transesterification polyols thereof contain on average 2 to at most 5 and preferably 2 to 4 NCO groups. Typical examples are phenyl diisocyanate, 1,5-naphthylene diisocyanate, 4,4'-diphenylmethane diisocyanate (MDI), hydrogenated MDI ($H_{12}$MDI), xylylene diisocyanate (XDI), tetramethyl xylylene diisocyanate (TMXDI), 4,4'-diphenyl dimethylmethane diisocyanate, di- and tetraalkyl diphenylmethane diisocyanate, 4,4'-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid-bis-isocyanatoethyl ester, also polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates are obtained, for example, by reaction of 2 moles of hexamethylene diisocyanate with 1 mole of thiodiglycol or dihydroxydihexyl sulfide. Other important diisocyanates are trimethyl hexamethylene diisocyanate, 1,4'-diisocyanatobutane, 1,12-diisocyanatododecane and dimer fatty acid diisocyanate. Also of interest are partially masked polyisocyanates which provide for the formation of self-crosslinking polyurethanes, for example dimeric tolylene diisocyanate, and polyisocyanates partly or completely reacted, for example, with phenols, tertiary butanol, phthalimide, caprolactam.

Aromatic isocyanates are generally preferred, as are oligomerized NCO-terminated adducts of the above-mentioned isocyanates and polyols, polyamines or aminoalcohols. However, even aliphatic isocyanates are unexpectedly capable of reacting quickly and completely, even at room temperature. Overall, hexamethylene diisocyanate (HMDI), toluene diisocyanate (TDI), diphenylmethane diisocyanate (MDI) and triphenylmethane triisocyanate (Desmodur® R) are preferred.

The polyurethanes obtainable by the process according to the invention are suitable for coatings, sealing compounds and adhesives. Both physical blowing methods (for example addition of FCHC's, HFCHC's, pentane, dimethyl ether) and chemical blowing methods (elimination of $CO_2$ after addition of water or carboxylic acids) may be used for the production of polyurethane foams.

Carboxylic acids and carboxylic acid esters

For the production of alkyd resins, the glycerol alkoxylates or their transesterification polyols may also be further crosslinked with polybasic carboxylic acids. However, the further crosslinking may also be carried out with mixtures of monobasic and polybasic carboxylic acids.

The production of the polyesters, polyester polyols and alkyd resins may take place in the presence of other polyhydric alcohols such as, for example, glycol, propane-1,2-diol, diethylene glycol, triethylene glycol, polyethylene glycol, diglycerol, 2,2-bis-(4-hydroxyphenyl)-propane, 2,2,4-trimethylpentane-1,3-diol, sorbitol, ditrimethylol propane, pentaerythritol, dipentaerythritol, sugar derivatives and neopentyl glycol.

Polybasic carboxylic acids are substances which contain at least two carboxyl groups and, optionally, other ether, ester, halogen, amide, amino, hydroxy and urea groups. Typical examples are adipic acid, sebacic acid, isophthalic acid, terephthalic acid, trimellitic acid, phthalic acid, hexahydrophthalic acid, tetrachlorophthalic acid, oxalic acid, malonic acid, succinic acid, glutaric acid, fumaric acid, citric acid, tartaric acid, dimerized or trimerized unsaturated fatty acids, optionally in admixture with monomeric unsaturated fatty acids, and optionally partial esters of these compounds.

Carboxylic acid esters are understood to be native and synthetic fatty acid glycerol esters corresponding to formula (I):

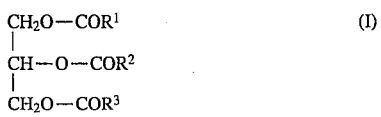

in which $R^1CO$, $R^2CO$ and $R^3CO$ independently of one another represent linear or branched, aliphatic or aromatic hydrocarbon radicals containing 6 to 22 carbon atoms and 0 to 3 double bonds. Typical examples of glycerol esters are natural triglycerides of vegetable or animal origin, such as for example rapeseed oil and sunflower oil from old or new plants, castor oil, palm oil, soybean oil or coconut oil, and chemically modified triglycerides of the soya polyol type which are obtained by epoxidation of soybean oil and subsequent opening of the oxirane rings with suitable nucleophiles, for example alcohols.

As already mentioned, the polybasic carboxylic acids or carboxylic acid esters may be used in admixture with $C_{1-22}$ monocarboxylic acids.

In one particular embodiment of the process according to the invention, polycondensation with polybasic carboxylic acids may be carried out first and is followed by polyaddition with polyfunctional isocyanates.

INDUSTRIAL APPLICATIONS

The glycerol alkoxylates to be used in accordance with the invention are distinguished in particular by the fact that they are easy to handle and show a high reaction rate and high compatibility. Since the hydroxyl values and functionalities of the glycerol alkoxylates mentioned are comparable with TMP, direct substitution is possible in many areas. The liquid consistency of the compounds—in contrast to TMP—leads to simplified handling, less equipment and less energy.

Accordingly, the present invention also relates to the use of addition products of on average 0.5 to 2 moles of ethylene and/or propylene oxide with glycerol for the production of polyaddition and polycondensation products.

The polyaddition products may be used as fibers (Lycra®, artificial leather, injection moldings, paints (more particularly so-called "DD paints") and rigid or flexible foams (for example Moltopren® or Vulkollan®)). The polycondensation products may be used as alkyd resins for stoving lacquers and air-drying paints.

The following Examples are intended to illustrate the invention without limiting it in any way.

EXAMPLES

Example 1

Comparison of the hygroscopic properties of glycerol, glycerol.1PO and TMP.

Quantities of approximately 5 g of the compounds were placed in glass beakers (500 ml) and stored for 3 h in a climatic chamber (30° C./80% air humidity) and then for 20 h at room temperature (around 40% air humidity). The results are set out in Table 1.

TABLE 1

| | Hygroscopic properties | | |
|---|---|---|---|
| Substance | Weight before g | Weight after g | Increase % by weight |
| TMP | 5.16 | 5.83 | 13.0 |
| Glycerol | 5.14 | 6.11 | 18.9 |
| Glycerol · 1PO | 5.08 | 5.67 | 11.6 |

Glycerol.1PO is less hygroscopic than TMP or glycerol.

Examples 2 to 5

Synthesis of polyols by transesterification of glycerol, glycerol.1PO, glycerol.3PO and TMP with rapeseed oil. A mixture of 994 g (1.12 mole) of rapeseed oil from new plants (oleic acid content >60% by weight) and such a quantity of a polyol compound according to Table 2 that the mixture had a hydroxyl value of 400 were introduced into a 3-liter three-necked flask. The mixture was transesterified under nitrogen for 4 to 6 h at 220° C. in the presence of 1.5 g of lithium hydroxide as catalyst. After cooling to 100° C., the mixture was dried in vacuo for 0.5 h, after which the products were evaluated for consistency. The results are set out in Table 2.

TABLE 2

| | Transesterification polyols | | | |
|---|---|---|---|---|
| Ex. | 2 | 3 | 4 | 5 |
| Adduct | Glycerol | Glycerol 1 PO | TMP | Glycerol 3 PO |
| Quantity g | 278 | 551 | 464 | 1708 |
| Consistency | Heterogeneous, two phases | Clear, homogeneous | Clear, homogeneous | Clear, homogeneous |

Examples 6 to 9

Comparison of cloud point and viscosity of transesterification polyols of glycerol with 0.5 to 1.25 moles of PO and rapeseed oil.

A mixture of 994 g (1.12 moles) of rapeseed oil from new plants (oleic acid content >60% by weight) and such a quantity of a reaction product of glycerol with 0.5 to 1.25 moles of propylene oxide according to Table 3 that the mixture had a hydroxyl value (OHV) of 400 were introduced into a 2-liter three-necked flask. The mixture was subjected to transesterification under nitrogen for 4 to 6 h at 220° C. in the presence of 1.5 g of lithium hydroxide as catalyst. After cooling to 100° C., the mixture was dried in vacuo for 0.5 h, after which the cloud point and viscosity of the products were measured at 25° C. The results are set out in Table 3.

TABLE 3

| Properties of the transesterification polyols | | | | |
|---|---|---|---|---|
| Ex. | PO | OHV | Cloud point °C. | Höppler viscosity mPas |
| 6 | 0.5 | 395 | 0 | 467 |
| 7 | 0.75 | 405 | −3 | 425 |

TABLE 3-continued

Properties of the transesterification polyols

| Ex. | PO | OHV | Cloud point °C. | Höppler viscosity mPas |
|---|---|---|---|---|
| 8 | 1 | 398 | −8 | 382 |
| 9 | 1.25 | 401 | −5 | 397 |

Examples 10 to 13

Polyurethanes based on transesterification polyols and MDI.

20 g of the transesterification polyols from Examples 2 to 5 were carefully mixed with 1 g of Baylith® paste, after which 20 g of technical methylene diphenyl diisocyanate (Desmodur® VKS) and then 1 drop of Formrez® UL 24 were added with stirring. The compositions were stored in a drying cabinet for 15.5 h at 90° C. and then for 2 h at room temperature. The Shore hardness of the PUR compositions was then measured. Compatibility was visually evaluated on a scale of 1 (compatibility good) to 3 (compatibility poor). The results are set out in Table 4.

TABLE 4

| | PUR casting compositions | | | |
|---|---|---|---|---|
| Ex. | 10 | 11 | 12 | 13 |
| Adduct | Glycerol | Glycerol 1 PO | TMP | Glycerol 3 PO |
| Compatibility | 3 | 1 | 1–2 | 1–2 |
| Shore D hardness | n.d. | 64.4 | 67.4 | 78.2 |

We claim:

1. A process for the production of polyaddition or polycondensation products, said process comprising reacting (i) an adduct of glycerol and a member selected from the group consisting of ethylene oxide, propylene oxide and mixtures thereof, said adduct having on average, 0.5 to 2 moles of said member per mole of glycerol with (ii) a member selected from the group consisting of polyfunctional isocyanates, polybasic carboxylic acids, and polybasic carboxylic acid esters.

2. A process as claimed in claim 1 wherein said adduct of glycerol has, on average 0.8 to 1.2 moles of said member per mole of glycerol.

3. A process as claimed in claim 1 wherein said member selected from the group consisting of ethylene oxide, propylene oxide, and mixtures thereof, is ethylene oxide.

4. A process as claimed in claim 1 wherein said member selected from the group consisting of ethylene oxide, propylene oxide, and mixtures thereof, is propylene oxide.

5. A process as claimed in claim 1 wherein said member selected from the group consisting of polyfunctional isocyanates, polybasic carboxylic acids, and polybasic carboxylic acid esters is a polyfunctional isocyanate selected from the group consisting of hexamethylene diisocyanate, toluene diisocyanate, diphenylmethane diisocyanate, and triphenylmethane triisocyanate.

6. A process as claimed in claim 1 wherein said member selected from the group consisting of polyfunctional isocyanates, polybasic carboxylic acids, and polybasic carboxylic acid esters is a polybasic carboxylic acid or ester thereof selected from the group consisting of phthalic acid, adipic acid, citric acid, maleic acid, and trimellitic acid.

7. A process as claimed in claim 1 wherein said member selected from the group consisting of polyfunctional isocyanates, polybasic carboxylic acids, and polybasic carboxylic acid esters is a polybasic carboxylic acid, said process further comprising reacting the resulting product with a polyfunctional isocyanate.

8. A process for the production of polyaddition or polycondensation products, said process comprising:

transesterifying an adduct of glycerol and a member selected from the group consisting of ethylene oxide, propylene oxide and mixtures thereof, said adduct having on average, 0.5 to 2 moles of said member per mole of glycerol, with a member selected from the group consisting of esters of $C_{1-4}$ alcohols and $C_{2-22}$ fatty acids, provided said group does not include esters of ricinoleic acid, and reacting the product of said transesterifying with a member selected from the group consisting of polyfunctional isocyanates, polybasic carboxylic acids, and polybasic carboxylic acid esters.

9. A process as claimed in claim 8 wherein said adduct of glycerol has, on average 0.8 to 1.2 moles of said member per mole of glycerol.

10. A process as claimed in claim 8 wherein said member selected from the group consisting of ethylene oxide, propylene oxide, and mixtures thereof, is ethylene oxide.

11. A process as claimed in claim 8 wherein said member selected from the group consisting of ethylene oxide, propylene oxide, and mixtures thereof, is propylene oxide.

12. A process as claimed in claim 8 wherein said member selected from the group consisting of polyfunctional isocyanates, polybasic carboxylic acids, and polybasic carboxylic acid esters is a polyfunctional isocyanate selected from the group consisting of hexamethylene diisocyanate, toluene diisocyanate, diphenylmethane diisocyanate, and triphenylmethane triisocyanate.

13. A process as claimed in claim 8 wherein said member selected from the group consisting of polyfunctional isocyanates, polybasic carboxylic acids, and polybasic carboxylic acid esters is a polybasic carboxylic acid or ester thereof selected from the group consisting of phthalic acid, adipic acid, citric acid, maleic acid, and trimellitic acid.

14. A process as claimed in claim 8 wherein said member selected from the group consisting of polyfunctional isocyanates, polybasic carboxylic acids, and polybasic carboxylic acid esters is a polybasic carboxylic acid, said process further comprising reacting the resulting product with a polyfunctional isocyanate.

* * * * *